United States Patent
Heilper et al.

(10) Patent No.: US 11,334,399 B2
(45) Date of Patent: May 17, 2022

(54) METHODS AND APPARATUS TO MANAGE POWER OF DEEP LEARNING ACCELERATOR SYSTEMS

(71) Applicant: Intel Corporation, Santa Clara, CA (US)

(72) Inventors: Anat Heilper, Haifa (IL); Oren Kaider, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 454 days.

(21) Appl. No.: 16/541,557

(22) Filed: Aug. 15, 2019

(65) Prior Publication Data

US 2019/0370086 A1 Dec. 5, 2019

(51) Int. Cl.

| | |
|---|---|
| *G06F 9/50* | (2006.01) |
| *G06N 3/063* | (2006.01) |
| *G06F 1/3228* | (2019.01) |
| *G06N 3/08* | (2006.01) |
| *G06F 1/28* | (2006.01) |
| *G06N 3/04* | (2006.01) |

(52) U.S. Cl.
CPC .............. *G06F 9/5094* (2013.01); *G06F 1/28* (2013.01); *G06F 1/3228* (2013.01); *G06N 3/04* (2013.01); *G06N 3/063* (2013.01); *G06N 3/08* (2013.01)

(58) Field of Classification Search
CPC ........ G06F 9/5094; G06F 1/28; G06F 1/3228; G06N 3/063; G06N 3/08; G06N 3/04
See application file for complete search history.

(56) References Cited

U.S. PATENT DOCUMENTS

| 2008/0022140 A1* | 1/2008 | Yamada ................ G06F 1/3203 713/322 |
|---|---|---|
| 2014/0040474 A1* | 2/2014 | Blagodurov .......... H04L 47/726 709/226 |
| 2015/0192980 A1* | 7/2015 | Sen ......................... G06F 1/329 713/320 |
| 2018/0062916 A1* | 3/2018 | Eda ...................... H04L 67/1008 |
| 2018/0285158 A1* | 10/2018 | Appu ..................... G06F 9/5044 |
| 2019/0332157 A1* | 10/2019 | Hsu ......................... G06F 1/329 |
| 2019/0369696 A1* | 12/2019 | Heilper ................. G06F 1/3206 |
| 2021/0012747 A1* | 1/2021 | Wang ...................... G06F 1/324 |

* cited by examiner

*Primary Examiner* — Nimesh G Patel
(74) *Attorney, Agent, or Firm* — Hanley, Flight and Zimmerman, LLC

(57) ABSTRACT

Apparatus, systems, methods, and articles of manufacture to manage power of deep learning accelerator systems are disclosed. An example apparatus includes a power manager and a power controller. The power manager is to generate a power table to allocate power frequencies between an accelerator and memory based on a ratio of compute tasks and bandwidth tasks in a first workload; update the power table based on a request to at least one of add a second workload or remove the first workload; and determine an index into the power table. The power controller is to determine a power consumption based on the power table; determine whether to update the index based on a power budget and the power consumption; and allocate power to the accelerator and the memory according to the power table.

23 Claims, 11 Drawing Sheets

METHODS AND APPARATUS TO MANAGE POWER OF DEEP LEARNING ACCELERATOR SYSTEMS

FIELD OF THE DISCLOSURE

This disclosure relates generally to power management and, more particularly, for managing power of deep learning accelerator systems.

BACKGROUND

Computer hardware manufacturers develop hardware components for use in various components of a computer platform. For example, computer hardware manufacturers develop motherboards, chipsets for motherboards, central processing units (CPUs), hard disk drives (HDDs), solid state drives (SSDs), and other computer components. Additionally, computer hardware manufacturers develop processing circuitry, known as accelerators, to accelerate the processing of a workload. For example, an accelerator can be implemented by dedicated circuitry, an integrated circuit, a CPU, a graphics processing unit (GPU), a vision processing unit (VPU), an application specific integrated circuit (ASIC), and/or a field programmable gate array (FPGA).

Figure 1:
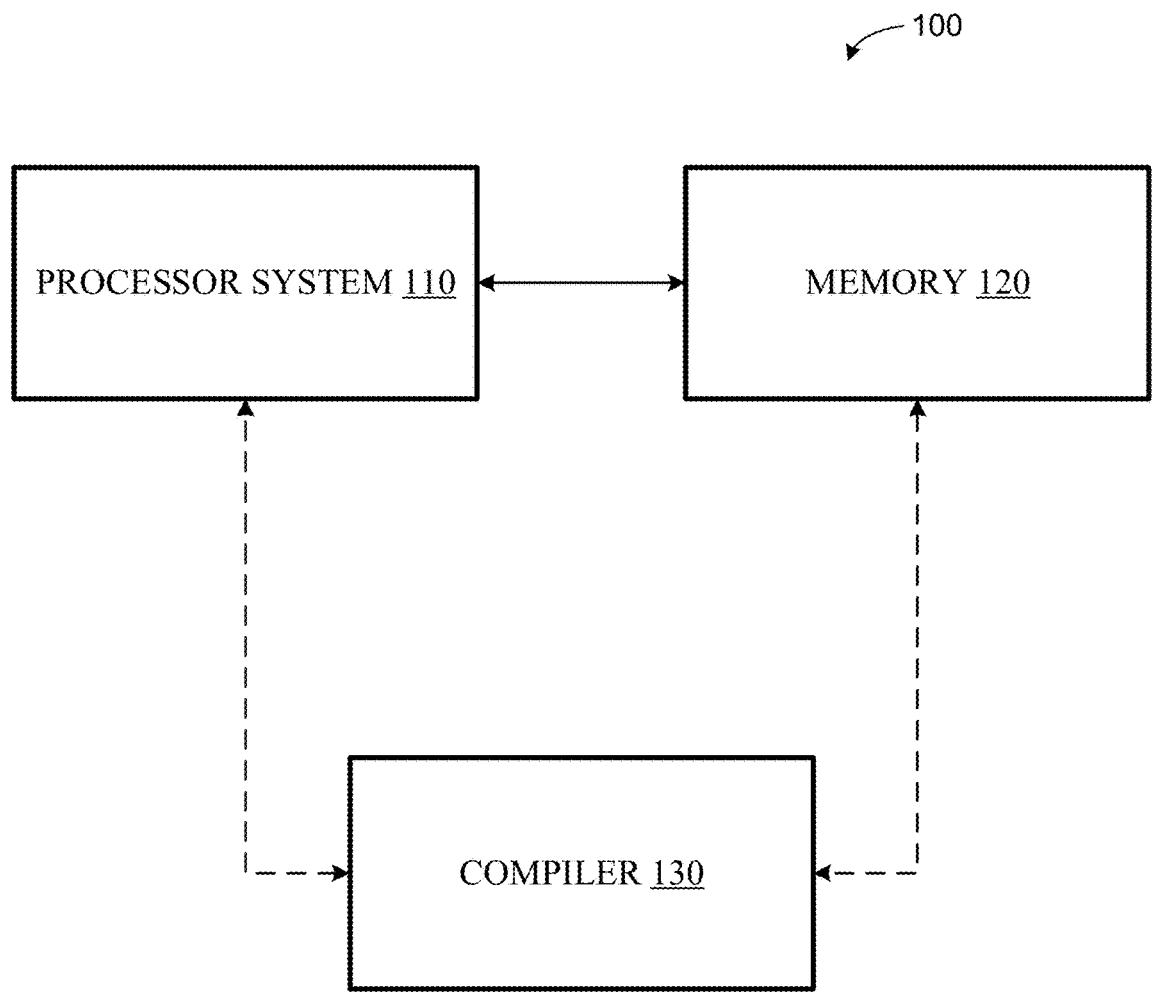
FIG. 1 is a block diagram of an example apparatus for configurable workload execution.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are systems, apparatus, methods, and articles of manufacture to dynamically manage power allocation to components in a computing device, such as an accelerator, etc.

Many computer hardware manufacturers develop processing circuitry, known as accelerators, to accelerate the processing of a workload. For example, an accelerator can be implemented by dedicated circuity, an integrated circuit, a central processing unit (CPU), a graphics processing unit (GPU), a vision processing unit (VPU), an application specific integrated circuit (ASIC), and/or a field programmable gate array (FPGA). Moreover, while accelerators are capable of processing any type of workload, accelerators are designed to improve (e.g., optimize, etc.) execution of one or more particular types of workloads. For example, while CPUs and FPGAs are designed to handle more general processing, GPUs are designed to improve the processing of video, games, and/or other physics and mathematically based calculations, and VPUs are designed to improve the processing of machine vision tasks.

Additionally, some accelerators are designed specifically to improve the processing of artificial intelligence (AI) applications. While a VPU is a specific type of AI accelerator, many different AI accelerators are available. For example, many AI accelerators can be implemented by application specific integrated circuits (ASICs). Such ASIC-based AI accelerators can be designed to improve the processing of tasks related to a particular type of AI, such as machine learning (ML), deep learning (DL), and/or other artificial machine-driven logic including support vector machines (SVMs), neural networks (NNs), recurrent neural networks (RNNs), convolutional neural networks (CNNs), long short term memory (LSTM), gate recurrent units (GRUs), etc.

Computer hardware manufactures also develop heterogeneous systems that include more than one type of processing circuit. For example, computer hardware manufactures may combine both general purpose processing circuit, such as CPUs, with either general purpose accelerators, such as FPGAs, and/or more tailored accelerators, such as GPUs, VPUs, ASICs, dedicated circuitry, and/or other AI accelerators. Such heterogeneous systems can be implemented as systems on a chip (SoCs).

As used herein, a workload is defined to be a capacity or function that is assigned or allocated to an accelerator and/or other processing circuitry for execution. For example, implementing a neural network, provisioning a virtual machine, establishing a database, configuring an application, etc., are workloads for execution by an accelerator and/or other processing circuitry. When a developer desires to run a function, algorithm, program, application, and/or other executable instruction on a heterogeneous system, the developer and/or software generates a schedule (e.g., a graph) for the function, algorithm, program, application, and/or other executable instruction at compile time. Once a schedule is generated, the schedule is combined with aspects of the function, algorithm, program, application, and/or other executable instruction to generate an executable file (either for Ahead of Time or Just in Time paradigms). Moreover, the schedule combined with specification for the function, algorithm, program, application, and/or other executable instruction may be represented as a graph including nodes, where the graph represents a workload and each node (e.g., a workload node) represents a particular task of that workload. Furthermore, the connections between the different nodes in the graph represent the data inputs and/or outputs needed in order for a particular workload node to be executed and the vertices of the graph represent data dependencies between workload nodes of the graph.

In certain examples, hardware accelerators are implemented as specialized hardware circuitry that may be used for deep learning and/or artificial intelligence applications. Accelerators may be utilized to accelerate tasks of deep learning and/or artificial intelligence workloads. For example, the accelerators may increase the speed of artificial neural network training for the artificial neural network. When at least one or more workloads are executed by at least one or more accelerators, power to the accelerators is managed to improve performance. Additionally, power allocated to additional processing circuitry and/or memory within the system (referred to herein as an accelerator system or a deep learning accelerator system) is to be managed to execute workloads.

AI applications and associated topologies involve a variety of numerical precision representations, different types and sizes of data, and advanced latency and power requirements. The workloads, topologies, and algorithms related to AI technologies frequently change. Additionally, some AI workload characteristics include inner layer-to-layer variation with respect to compute and/or bandwidth usage of computing devices.

Disclosed herein are advancements to fine tune different power requirements of components of a computing device (e.g., an accelerator) during the execution of a workload such as an AI workload, etc. Traditional power improvement (e.g., optimization) methods do not account for differences in AI workload behavior. Additionally, in some examples, AI workloads feature domain specific improvement (e.g., optimization) opportunities because such AI workloads may have more regular (e.g., predefined, expected, etc.) behavior than usual client applications. In some examples disclosed herein, prior or advanced knowledge can provide power improvement (e.g., optimization) hints and/or directions that can be better utilized in hardware assisted power management circuits.

Examples disclosed herein include a hardware/software co-design that leverages compiler knowledge of an AI workload to drive power management of a power control circuit (also referred to herein as a power control unit or punit) driving configuration and execution of an accelerator and/or other computing device. Components of the computing device including, for example, an AI accelerator (or portion thereof) and/or other power consumption circuits, negotiate with the power control circuit for power and performance improvement (e.g., optimization). The knowledge of workload performance that is analyzed, processed, and shared by the compiler includes, in some examples, data related to the operation of the power consumption units in the form of a configurable table or graph of power levels tuned according to different workload scenarios of the power consumption units. A power manager consolidates requests for power from power consumption circuits and determines a table of frequency values (e.g., clock frequencies, etc.) to drive the power control circuit to deliver power to the power consumption circuits using the knowledge shared by the compiler. An index or level in the power table of frequency values indicates the level of power to be provided to the power consumption circuits for an amount of time, for example.

Examples disclosed herein provide a unique and flexible method of power and performance improvement (e.g., optimization) for AI training and inference workloads that enables fast, efficient improvement (e.g., optimization) of power allocation on-the-fly and/or otherwise dynamically. Utilizing the advanced knowledge analyzed and developed by the compiler is unique for AI workloads and graphs. Furthermore, the compiler activity can occur offline rather than during a runtime or execution phase of the computing device. In addition, power aware compilation or compiler guided power allocation utilizes the advanced knowledge or data in the compilation process and enables the power management hardware such as the power manager, the power control circuit, etc., to make accurate power determinations, to dynamically fine grain control the power policy, to reduce the need for power guard bands, and to provide better quality of services to the different circuitry running in the computing device, each of which has its own power usage characteristics.

Certain examples provide a dynamic power controller or manager to determine frequency changes based on combined requirements of workloads that are running on an accelerator and to regulate power budget based on the determined frequency changes. The combined requirements are known in advance.

Prior power improvement (e.g., optimization) and management solutions relied only on a history of executed workloads. Based on that history of heuristics and actual performance, they tried to improve power decisions over time. However, such prior approaches did not have prior knowledge (e.g., meta-data determined from analysis of instructions, etc.) of the nature of the workloads that are executed. Thus, such prior approaches are not able to detect execution patterns. As such, static heuristics that exist in the power controller may be beneficial in some cases, but, in other cases, may cause performance degradation. With such prior approaches, there is no ability to modify behavior in a dynamic manner.

In contrast, certain examples disclosed herein address these deficiencies by providing a device and associated method for a software/hardware interface that determines the power management policy to reduce or increase power budget. The interface exposes a power table that can be updated through software power management that factors in both precompiled requirements from different workloads that are running on the computing device and management interface requests that can come during execution.

Certain examples provide dynamic power improvement (e.g., optimization) or management heuristics including power heuristics that can be dynamically modified by updating a power table, executing performance experiments, and fine tuning of power levels or indices and level/index selection within the power table. Further, during compilation of a workload, the compiler determines a desired frequency ratio between compute and bandwidth resources for different portions or sections of the workload execution. The compiler can aggregate frequency ratio requests for different sections of workload execution to form levels or indices of frequency distribution in the power table that may change over time. Runtime software on the computing device can manage executed workloads and provide heuristics to serve running workloads, for example.

With deep learning accelerators, for example, a roughly finite set of operations are used to build workloads. These workloads are compiled using a dedicated compiler and executed on the accelerator. These workload operations have compute and bandwidth characteristics that can change significantly based on, for example, which layer of the network model is being implemented by the accelerator (e.g., is it a compute-intensive layer involving many computing operations, a memory access-intensive layer involving many data transfer/loading/storing operations, etc.), and, thus, have different frequency ratio requirements.

To improve performance, a power controller on the computing device is to have a holistic view of frequency requirements of overall executed workloads on the accelerator. The power controller factors in external power requirements (e.g., thermal constraints, etc.) and workload requirements to determine frequencies for power allocation to system components (e.g., memory resources, computing resources, etc.).

Certain examples provide a power manager or power controller to generate, update, and/or otherwise manage a power table that stores power levels and frequency ratios between computing structures (e.g., accelerators, etc.) and memory structures of the computing system (e.g., the deep learning accelerator system, etc.). Frequency requirements (e.g., a frequency ratio, also referred to as a work ratio, etc.) for components of the system form part of the compiling of deep learning applications for execution on the system, for example.

AI accelerators have a finite set of workloads running on the accelerator at any given time. The compiler can improve (e.g., optimize) workload execution and provide different frequency ratios (e.g., cache versus computing circuit, memory versus accelerator, etc.) to different parts of the graphs representing the compiled workload(s). A runtime stack can take these hints and build a dynamic power table and perform power heuristics that are based on compiler power hints along with runtime considerations of multiple workloads that are running on the computing device.

The compiler can generate a set of dynamic voltage and frequency scaling (DVFS) points that can be resolved at a whole-graph level and/or inside the graph, for example. At the graph level, a DVFS ratio for the whole graph (e.g., of memory to cache to accelerator, etc.) can be generated, for example. In some examples, compute circuit frequency can be changed within a graph. Thus, the compiler works with a power manager to generate a plurality of power solutions in conjunction with compilation of workload functions, and the power manager of the computing device (e.g., of the accelerator system, etc.) can select from among the power solutions for operation.

The power manager includes and/or is formed from runtime software to build a dynamic power table used by the power controller when a power change is to be made. As such, rather than only heuristics, a decision on power change is additionally or alternatively based on real workload information, for example. The power table can be updated based on requests to add and/or remove workload(s) from execution by the computing device, for example. The power manager can dynamically determine and update frequency ratios for each workflow and associated relative frequency change of components based on adding and/or removing workloads from execution by the accelerator system and/or other computing device, for example. The power manager is to determine an index or level corresponding to each frequency/work ratio in the power table, for example. The power controller can determine a power consumption of the system based on the index/level in the power table and can determine whether to update the index/level based on a power budget and the power consumption, for example.

FIG. 1 is a block diagram of an example apparatus 100 for configurable workload execution. The example apparatus 100 includes a processor system 110, memory 120, and a compiler 130. The example apparatus 100 can be an AI accelerator to execute a plurality of AI workloads, etc. The example apparatus 100 can have a plurality of implementations. For example, the apparatus 100 can be implemented as a system-on-a-chip (SoC). The apparatus 100 can be implemented as a plurality of separate circuits, for example. In some examples, the processor system 110 and memory 120 are implemented as a first device with the compiler 130 located on a second device in communication with the first device. In certain examples, the processor system 110 and/or the memory 120 are in communication with the compiler 130 through a compilation blob and/or other wireless communication without a direct hardware link. In other examples, the processor system 110, memory 120, and compiler have a hardwired communication link.

Operation of the apparatus 100 are described in connection with certain examples further below. In brief, the example processor system 110 determines a configuration of its constituent processor circuitry and/or memory 120 to execute one or more workloads based on data obtained from the example compiler 130 and/or executes deep learning and/or other AI workloads using the determined configuration. In certain examples, the processor system 110 includes one or more accelerators. Other compute circuitry such as processors, other circuitry, etc., can also be included in the processor system 110. The processor system 110 also includes power management, such as a power manager or power driver, a power controller, etc. In some example, the processor system 110 can also include on-board memory separate from the memory 120 to cache instructions, a power table, other configuration information, etc.

The example memory 120 stores data such as executable application information, configuration information, power table information, etc. The example memory 120 can be implemented as a random access memory (RAM) such as a double data rate (DDR) synchronously dynamic RAM (SDRAM), last level cache (LLC), etc.

The example compiler 130 compiles at least one workload of at least one deep learning and/or other AI application. In response to the compilation of at least one workload, the example compiler system 140 determines data utilized by system components, such as work ratios for each workload and/or the relative frequency change of at least one accelerator, etc. The example compiler system 140 provides at least one deep learning application access to the example processor system 110 by compiling the application for execution using the processor system 110 and by providing the processor system 110 with characteristics and/or other execution information to allow the processor system 110 to determine frequency ratios for power allocation to circuitry of the processor system 110, for example.

As such, the example apparatus 100 includes one or more AI accelerators to execute AI workloads. For example, the apparatus 100 can be configured to execute deep learning inference workloads. The compiler 130 receives a neural network representation, for example, an outputs information that can be executed with specific inferences, optimized or otherwise tailored to a deep learning workload, for example. An example workload includes compute tasks and memory bandwidth tasks. Each workload includes a different ratio of compute tasks to memory tasks. The compiler 130 generates instructions for execution by one or more accelerators of the processor system 110 and can also generate information for the compiler 130 and/or the processor system 110 to determine a ratio of frequencies (also referred to herein as power frequencies such as clock frequencies, etc.) between compute resources and memory resources in the processor system 110 involved in executing the workload. Information from the compiler 130 can be used to generate tailored, dynamic, more accurate determinations of power allocation and generation for workload execution by the processor system 110.

In certain examples, one or more accelerators can be used to execute one or more workloads. A plurality of accelerators can be integrated, for example. Additionally or alternatively, a plurality of accelerators can maintain coherency through shared memory 120, a converged coherence fabric (CCF), etc. A specific ratio of frequencies can be generated to allocate power among computing and memory resources to accommodate the one or more workloads to be executed using the processor system 110 and memory 120. Thus, rather than relying on pre-set heuristics to allocate power, characteristics of currently executing workloads can be leveraged to generate and update power allocation on the fly. As workload(s) change, the processor system 110 and memory 120 can adapt. Information regarding a ratio of compute tasks to memory bandwidth tasks can be determined by the compiler 130 in a compilation phase and can be utilized by the processor system 110 (e.g., by a power manager, also referred to as a power driver, in the processor system 110) to dynamically determine, at workload runtime, frequency allocation to provide power to circuitry of the processor system 110 and memory 120. Characteristics, such as compute instructions (e.g., arithmetic instructions, logic instructions, etc.), memory instructions (e.g., load instruction, store instructions, move instructions, other data transfer instructions, etc.) of each executing workload are considered in the allocation, and the ratio (e.g., a ratio of compute instructions to memory instructions (e.g., 3:2, 2:3, 1:5, 5:1, etc.) for a workload or portion thereof, etc.) remains until a workload is added or removed from execution, for example.

Figure 2A:
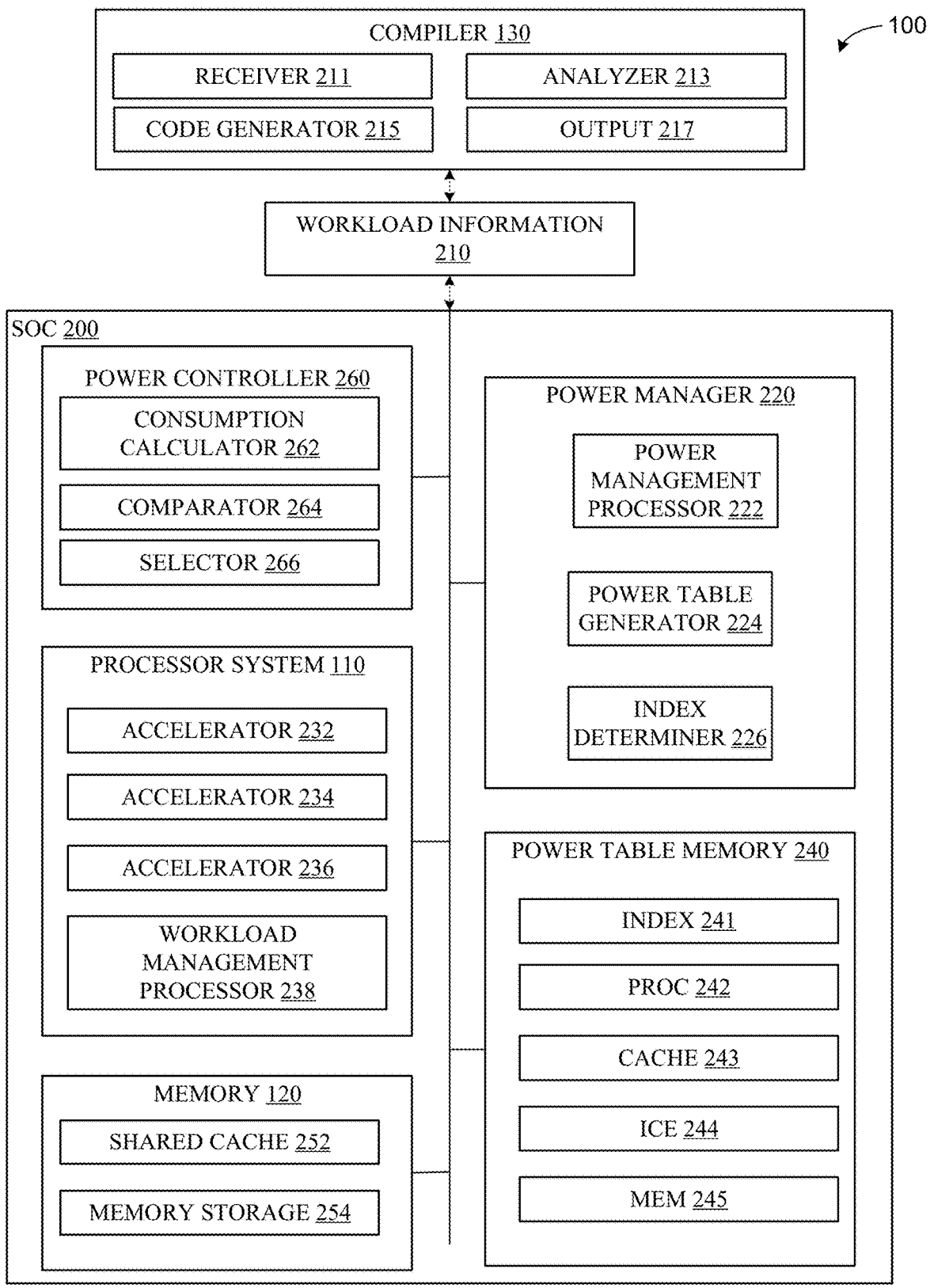
FIGS. 2A-2B are block diagrams of example implementations of the apparatus of FIG. 1 structured in accordance with the teachings of the present disclosure.

FIG. 2A is a block diagram of an example implementation of the example apparatus 100 of FIG. 1. In the implementation of FIG. 2A, the example apparatus 100 includes the example processor system 110 and memory 120 implemented as a system on chip 200 in communication with the example compiler 130. As shown in the example of FIG. 2A, the compiler 130 provides workload information 210 including one or more deep learning workload executables and associated characteristics (e.g., compute and memory requirements/ratio, etc.) to execute the workload. For example, the compiler 130 can provide workload information 210 such as deep learning inference workload information including a trained neural network model configuration to infer or predict testing samples and associated characteristics regarding compute and memory bandwidth usage for phases of the inference. For example, the compiler 130 can analyze the source code representing executable instructions for the workload to extract instruction type, instruction function, etc., to classify the instruction as a compute-related instruction (e.g., an arithmetic action, a logic action, etc.) or a memory access-related instruction (e.g., a memory or other data transfer action, etc.).

The example processor system 110 shown in FIG. 2A includes the processor system 110, the memory 120, a power manager 220, a power table memory 240, and a power controller 260. The example power manager 220 includes a power management processor 222, a table generator 224, and an index determiner 226. The example processor system 110 of FIG. 2A includes a plurality of accelerators 232-236 as well as a workload management processor 238. While the example of FIG. 2A shows three accelerators 232-236 and one workload management processor 238, any number of accelerator(s) 232-236 and workload management processor(s) 238 may be implemented in the processor system 110. The example power table memory 240, which can be separate from and/or included with memory 120, the power controller 260, etc., stores one or more indices 241 allocating a frequency range 242-245 to each of a plurality of components. The example memory 120 of FIG. 2A includes a shared cache 252 (e.g., an LLC, etc.) and a memory storage 254, such as DDR DRAM, DDR SDRAM, etc.

The power management processor 222 of the power manager 220 processes the workload information 210 from the compiler 130 to determine a ratio of compute resources to memory bandwidth resources to execute the workload. For example, as shown in FIG. 2A, the compiler 130 includes a receiver 211 to receive program source code for compilation, an analyzer 213 to analyze the code, a code generator 215 to compile or generate an executable from the received source code, and an output 217 to provide the executable for execution by the SoC 200. The code can include instructions for configuration and execution of a workload, such as deep learning neural network inferencing, etc. The code generator 215 forms the executable from the source code, and the analyzer 213 processes the code to determine a comparison or ratio between computing tasks and memory access tasks in the executable. For example, the analyzer 213 can determine dynamic voltage and frequency scaling (DVFS) transition/optimization points and associated frequency or work ratios from the code analysis. For example, by analyzing machine instructions, the analyzer 213 can determine which operations involve computation and which operations involve memory access or transfer (e.g., by determining which instructions are data transfer instructions (e.g., move, load, input, output) and which instructions are arithmetic instructions (e.g., add, subtract, increment, decrement, convert, compare, etc.) or logic instructions (e.g., AND, OR, exclusive OR, shift, rotate, test, etc.)). The analyzer 213 can then determine at which point(s) the execution of the workload is to be compute intensive, memory bandwidth intensive, etc.

In certain examples, the analyzer 213 performs two passes of code and power options to generate one or more DVFS transition (e.g., optimization) points. For example, the analyzer 213 performs an initial pass to determine a DVFS solution as an approximated inference per second with no power changes. Based on power budget information, a second pass can utilize any power budget remaining after the first pass to add a subset of frequencies to run the workload. A power configuration can be determined that provides a lowest execution time using a valid power budget, for example.

The output 217 generates workload information 210 including the executable and associated ratio, DVFS point, other code information, etc., from the analyzer 213 and the code generator 215, for example. In some examples, a plurality of workload transition points (e.g., a top three, five, etc.) can be output for use by the power manager 220.

The power management processor 222 receives a new workload scheduled for execution on the set of accelerators 232-236. The workload information 210 from the compiler 130 can include (e.g., represented as meta-data) workload power characteristics such as a list of frequencies and/or a set of one or more optimization points at which the workload should run. For example, an initial portion of the workload may be bandwidth intensive and involve much memory access, while a later portion of the workload may be compute intensive and involve one or more accelerators 232-236 and/or other processor 238 in the processor system 110. The power management processor 222 consolidates power information for one or more running workloads based on the workload information 210 and triggers the power table generator 224 to generate and/or update the power table 240 when workload(s) executing on the SoC 200 change, for example. The power management processor 222 reads a current power level from the power controller 260 and determines new power levels by consolidating workload requests and associated power characteristics.

The example power table generator 224 generates and/or updates the power table in the power table memory 240 based on the compute versus memory power and frequency ratio(s) (also referred to as work ratios) determined by the power management processor 222. The example table generator 224 stores each integrated work ratio to a row or entry of the power table within the example power table memory 240. Each row of the power table corresponds to one work ratio option (e.g., operating frequencies for the processor system 110 versus operating frequencies for memory 120, etc.) for the example processor system 110 and memory 120 to execute at least one workload. As shown in the example of FIG. 2A, the power table memory 240 stores an index 241 which sets a power frequency allocation (and, in some cases, acceptable variation) for each of the available components, such as the workload management processor allocation 242, cache allocation 243, accelerator allocation 244, memory allocation 245, etc. The table generator 224 triggers the index determiner 226 to update an index into the power table when the power table has been generated and/or updated in power table memory 240.

For example, Table 1 below illustrates an example power table stored in the power table memory 240 defining levels or indices 241 of frequency information for the power controller 260. For each level/index 241, the processor system 110 and memory 120 have an associated frequency and/or power level to be allocated/assigned by the power controller 260 (also called the power control unit or "punit"). Each index 241 represents a step or increment of change for the associated circuit (e.g., 25 MHz, 100 MHz, etc.). For example, high indicates high memory accesses, medium indicates some memory access requests, and low indicates no use of the memory during inference. In some examples, low, medium, and high are determined at time of manufacture of the circuit and correspond to a particular setting or range (e.g., low=700 MHz, medium=1700 MHz, high=3000 MHz, etc.).

TABLE 1

Example Power Table Interface Between Compiler and Runtime Power Management.

| Index | PROC | CACHE | ACC1 | ACC2 | ACC3 | MEM |
|---|---|---|---|---|---|---|
| 0 | | 1000 | 500/+20 | 500 | | Low |
| 1 | | 1000 | 600/+30 | 500 | 500 | Low |
| 2 | | 1500 | 600/+30 | 600 | 500 | Medium |
| 3 | 500 | 1500 | 600/+20 | 600 | | Medium |
| ... | ... | ... | ... | ... | ... | ... |
| N | | 2000 | 600/−20 | 600 | 500 | High |

In certain examples, a ratio can be expressed as a transition or improvement (e.g., optimization) point at which a balance between compute resources and memory resources changes in accordance with workload execution. As shown in the example of Table 1, a DVFS transition/improvement point varies according to the index or level in the power table. In certain examples, an acceptable variation or amount of change can be specified to aid the power controller 260 in adjusting and allocating power frequencies to the SoC 200. For example, at index 2 in the example of Power Table 1, the first accelerator ACC1 can be allocated at 600 MHz. However, the power controller 260 can adjust this value up to 630 MHz before necessitating a different index in the table. At index N, accelerator 1 can still be allocated at 600 MHz, but a downward adjustment to 580 MHz is allowed at index N before triggering selection of a different index.

The example index determiner 226 determines an index corresponding to one row or level of the example power table (e.g., Table 1, etc.) in memory 240. In certain examples, a default index, such as index 0, etc., can be specified for automatic selection by the power controller 260 to configure power allocation/usage of the SoC 200. However, the index determiner 226 can analyze the power table in memory 240 and SoC 200 resource information to determine and recommend another index (e.g., index 2, index N, etc.) rather than a default of index 0 to the power controller 260, for example. For example, based on a current index to the power table, the index determiner 226 can compute an updated index to the power table in power table memory 240 and can transmit the updated index to the power controller 260.

The power controller 260 can operate according to a power configuration specified at a selected index in the power table stored in memory 240. In certain examples, the power controller 260 calculates power consumption for the SoC 200 to determine whether the systems of the SoC 200 are within an allocated power budget. The power controller 260 can adjust power consumption by increasing or reducing allocation accordingly by moving up or down among indices in the power table. Thus, when more power is available for allocation, an index in the power table can allocate more power, and, when less power is available for allocation, another index in the power table can allocate less power. Further, when the executing workload(s) call for greater computing resources, an index in the power table can allocate more power to the accelerator(s) 232-236, workload management processor 238, etc., rather than memory 120. However, when the executing workload(s) involve greater need for memory bandwidth, another index in the power table can allocate more power to memory 120, rather than the processor system 110, for example.

As shown in the example of FIG. 2A, the example power controller 260 includes a consumption calculator 262, a comparator 264, and a selector 266. As discussed above, the power controller 260 is notified by the power manager 220 regarding an update to the power table memory 240. The consumption calculator 262 calculates power consumption from executing workload(s) on the SoC 200 and information from the power manager 220. As such, the consumption calculator 262 can determine a current power level for the SoC 200. The comparator 264 can compare the current power level to a threshold (e.g., maximum power level, limit, etc.). When the current power level is less than the threshold, the comparator 264 can trigger a reselection of an index or level in the power table memory 240. The selector 266 selects an index or level in the power table memory 240 for frequency configuration and power allocation in the SoC 200.

In the example of FIG. 2A, the power manager 220 and its power management processor 222 and power table generator 224 implement means for generating a power table and means for updating the power table. For example, the power management processor 222 processes workload meta-data to determine frequency allocation, and the power table generator 224 forms and updates the power table using the frequency allocation. The example index determiner 226 of the power manager 220 implements means for determining an index into the power table. The example power controller 260 implements means for allocating power among accelerator(s) 232-236 and memory 120 using the power table. For example, the consumption calculator 262 of the power controller 260 determines a power consumption. The example comparator 264 determines whether to update the index based on a power budget and the power consumption. The example selector 266 allocates power to the accelerator 232-236 and the memory 120 according to the power frequencies at the index of the power table.

Figure 2B:
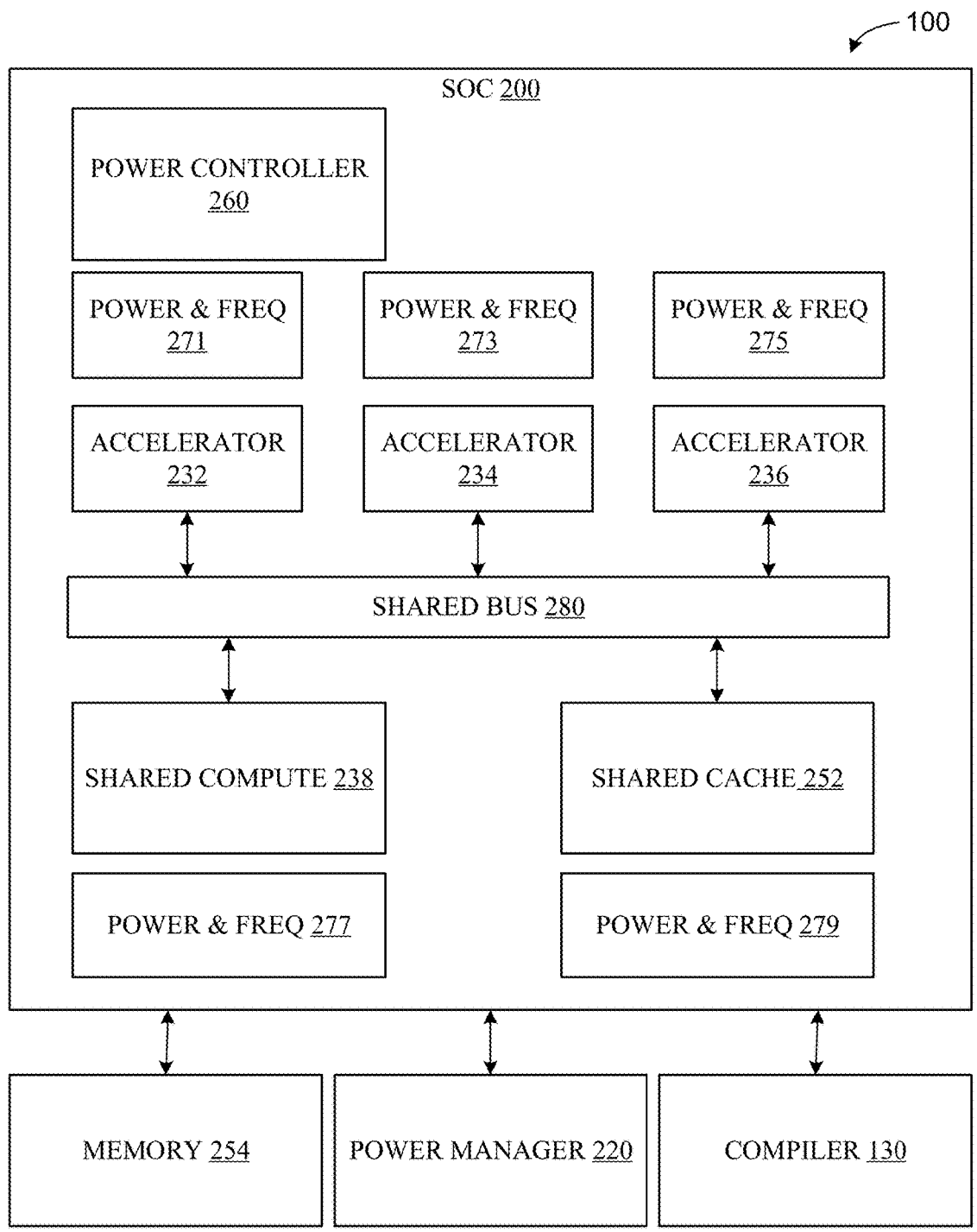

FIG. 2B illustrates an alternative arrangement of the example apparatus 100. In the example of FIG. 2B, the power manager 220 and memory storage 254 are located external to the SoC 200, along with the compiler 130. Additionally, the power controller 260 generates power and frequency controls 271-279 associated with the accelerators 232-236, shared compute resource (e.g., the workload management processor) 238, shared cache 252, etc. Memory 254 storing program code, executables, etc., is located external to the SoC 200 and separate from, or in conjunction with, the compiler 130. A shared bus 280 connects the components of the SoC 200 to execute workload tasks such as neural network inferencing, convolutional layers, etc. As described above with respect to FIG. 2A, the power manager 220 generates and/or updates a power table of settings for accelerators 232-236, memory 252, 254, etc.

In the example of FIG. 2B, the power manager 220 transmits the power table to the power controller 260, which generates power and frequency controls 271-279 for the SoC 200 based on a selected index of the power table (e.g., a default index, an index specified by the power manager 220, an index determined by the power controller 260, etc.). As such, a frequency is assigned to respective components of the SoC 200 to execute/implement workload(s). For example, during workload execution, an accelerator 232-236 frequency can be adjusted according to operations that are executed. Optimization points for adjustment to accelerator frequency are determined by the compiler 130, and such frequencies are assigned by the power manager 220. In certain examples, a relative frequency change can be added or subtracted within a power level of the power table for an accelerator 232-236. The relative frequency change is local to the particular accelerator 232-236 and does not affect memory 252, 254 (e.g., LLC, DDR, etc.) frequency.

In the example of FIG. 2B, the power manager 220 implements means for generating a power table, means for updating the power table, and means for determining an index into the power table. The example power controller 260 implements means for allocating power among accelerator(s) 232-236 and memory 120 using the power table by determining a power consumption, determining whether to update the index based on a power budget and the power consumption, and allocating power to the accelerator 232-236 and the memory 120 according to the power frequencies at the index of the power table.

Figure 3:
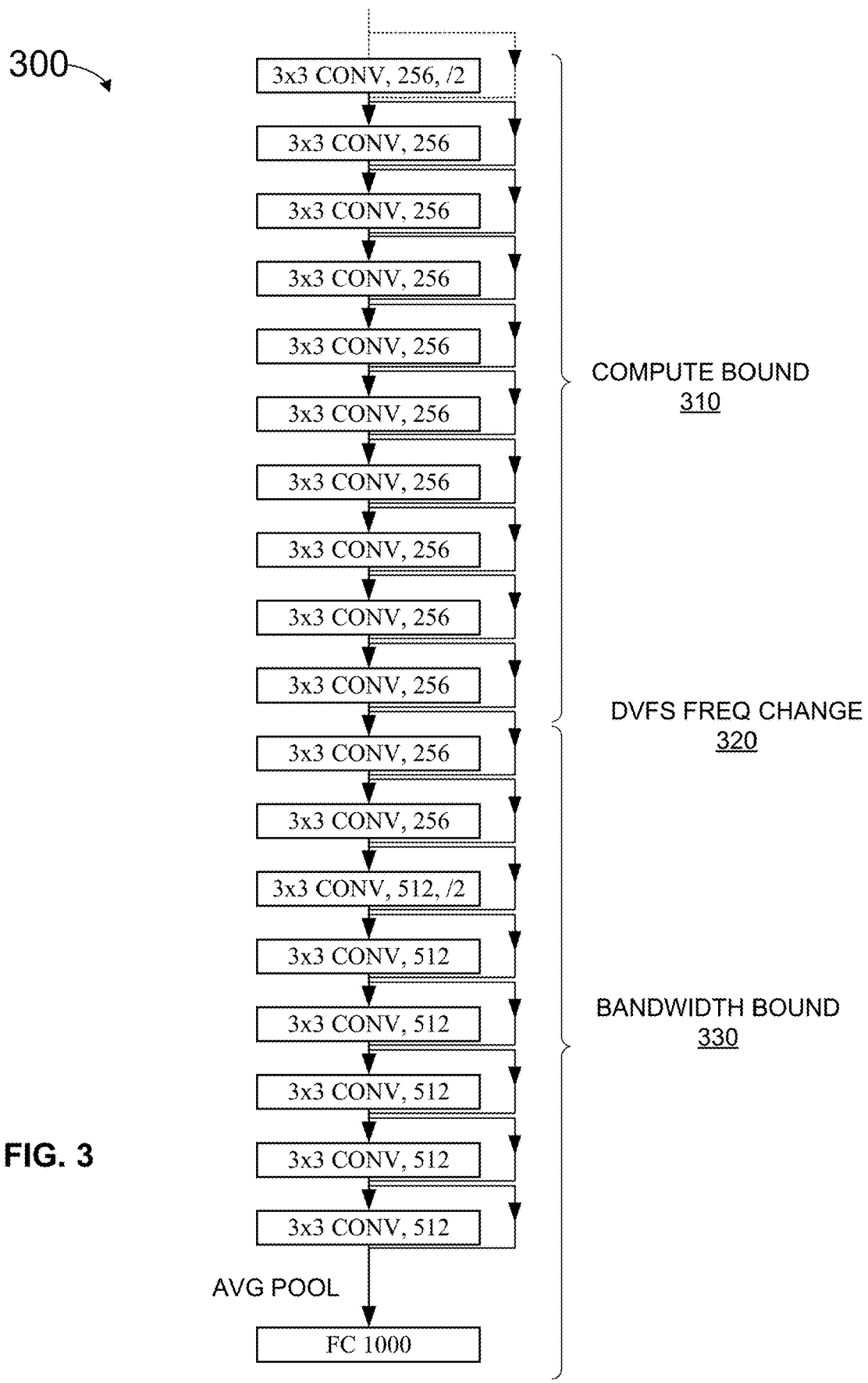
FIG. 3 depicts an example workload structured in accordance with the teaching of the present disclosure to implement convolution filters for a deep learning neural network.

FIG. 3 depicts an example workload 300 to implement convolution filters for a deep learning neural network. During the workload, behavior changes between compute-intensive execution to bandwidth-intensive execution. For example, in the workload 300, a first half 310 is compute-limited, and a second half 330 is bandwidth-limited, with an optimization point 320 for DVFS frequency change in between the phases or stages 310, 330 of the workload 300. In certain examples, the power manager 220 computes a weighted sum of frequency requests for currently executing workloads and sends an aggregated request to the power controller 260. The power manager 220 can provide options for flexibility of the power controller 260 via a plurality of levels and associated indices for power frequency allocation in the SoC 200, for example.

Figure 4:
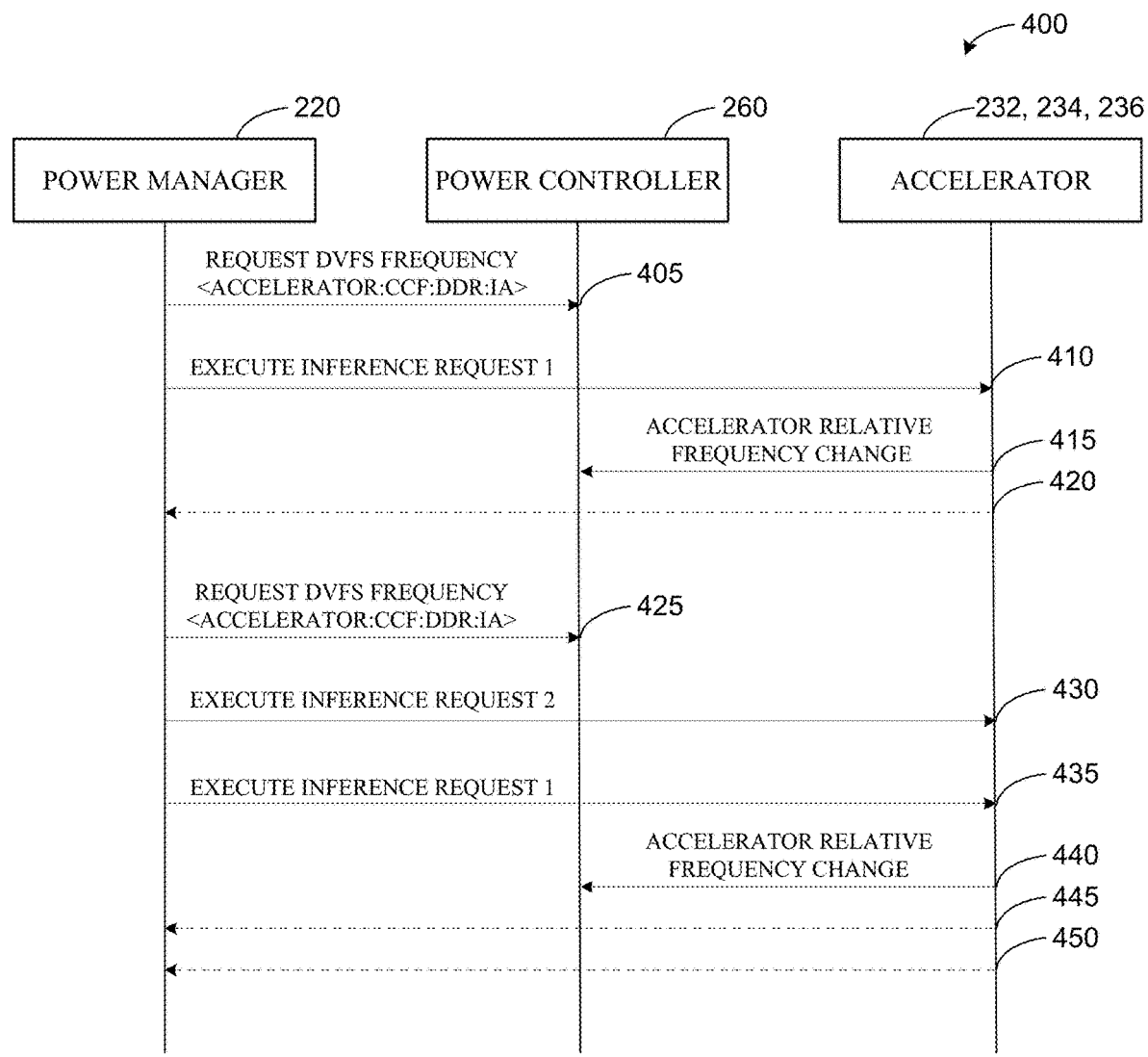
FIG. 4 illustrates an example control flow of the example apparatus of FIG. 1.

FIG. 4 is an example data flow diagram 400 illustrating a flow of instructions among the power manager 220, power controller 260, and an accelerator 232-236 to execute two deep learning inference workloads on the example apparatus 100 of FIG. 2A. At 405, the example power manager 220 sends a request for DVFS frequency (e.g., specifying a ratio of accelerator to shared memory to other memory to shared compute processor, etc.), also referred to as the work ratio, to the example power controller 260, which allocates frequencies to provide power to circuitry of the SoC 200. At 410, the example power manager 220 sends an instruction to execute the inference request to at least one of the example accelerators 232-236, which will execute the inference request workload. At 415, during execution of the inference request, at least one of the example accelerators 232-236 sends a request for a relative frequency change to the example power controller 260, and the power controller 260 determines whether to grant the relative frequency change to the accelerator(s) 232-236 based on power consumption and availability according to the power table memory 240. At 420, a result or status update is returned by the accelerator 232-236 to the power manager 220.

At 425, the example power manager 220 sends a DVFS frequency request for a second inference to the example power controller 260. At 430, the example power manager 220 sends an instruction to execute the second inference request to at least one of the example accelerators 232-236. At 435, the example power manager 220 sends an instruction to execute the first inference request to at least one of the example accelerators 232-236. At 440, in response to the first and second inference requests, at least one of the example accelerators 272-276 sends a relative frequency change request to the example power controller 260, which determine whether to grant or deny the relative frequency change to the accelerator(s) 232-236 based on power consumption and availability according to the power table memory 240. At 445, the example accelerator(s) 232-236 provide a status update on execution of the first inference request to the example power manager 220. At 450, the example accelerator(s) 232-236 provide a status update on execution of the second inference request to the example power manager 220.

As such, the power manager 220 can coordinate execution of inference requests by the accelerator(s) 232-236, and the power controller 260 can allocate power frequency accordingly. The power manager 220 receives a DVFS request generated by the compiler 130 that includes a relative ratio of work frequencies between components of the SoC 200, and an instruction by the power manager 220 to load the inference to the accelerator 232-236 triggers a request for DVFS allocation by the power controller 260. The compiler 130 can determine DVFS ratios based on empirical measured data, calculated according to a model or formula of workload layer behavior, overall system workload requirements, etc. During an inference request, an accelerator 232-236 can send a request to the power controller 260 to increase or decrease its allocated frequency, and the power controller 260 can adjust according to the power table, for example.

While example implementations of the example apparatus 100 are illustrated in FIGS. 1-2B, one or more of the elements, processes, and/or devices illustrated in FIGS. 1-2B may be combined, divided, re-arranged, omitted, eliminated, and/or implemented in any other way. Further, the example processor system 110, example memory 120, the example compiler 130, the example SoC 200, the example receiver 211, the example analyzer 213, the example code generator 215, the example output 217, the example power manager 220, the example power management processor 222, the example power table generator 224, the example index determiner 226, the example accelerator 232-236, the example workload management processor 238, the example power table memory 240, the example shared cache 252, the example memory storage 254, the example power controller 260, the example consumption calculator 262, the example comparator 264, the example selector 266, the example power and frequency control 271-279, the example bus 280, and/or, more generally, the example apparatus 100 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example processor system 110, example memory 120, the example compiler 130, the example SoC 200, the example receiver 211, the example analyzer 213, the example code generator 215, the example output 217, the example power manager 220, the example power management processor 222, the example power table generator 224, the example index determiner 226, the example accelerator 232-236, the example workload management processor 238, the example power table memory 240, the example shared cache 252, the example memory storage 254, the example power controller 260, the example consumption calculator 262, the example comparator 264, the example selector 266, the example power and frequency control 271-279, the example bus 280, and/or, more generally, the example apparatus 100 are hereby expressly defined to include a non-transitory computer readable storage device or storage disk such as a memory, a digital versatile disk (DVD), a compact disk (CD), a Blu-ray disk, etc. including the software and/or firmware. Further still, the example processor system 110, example memory 120, the example compiler 130, the example SoC 200, the example receiver 211, the example analyzer 213, the example code generator 215, the example output 217, the example power manager 220, the example power management processor 222, the example power table generator 224, the example index determiner 226, the example accelerator 232-236, the example workload management processor 238, the example power table memory 240, the example shared cache 252, the example memory storage 254, the example power controller 260, the example consumption calculator 262, the example comparator 264, the example selector 266, the example power and frequency control 271-279, the example bus 280, and/or, more generally, the example apparatus 100 may include one or more elements, processes, and/or devices in addition to, or instead of, those illustrated in FIGS. 1-2B, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
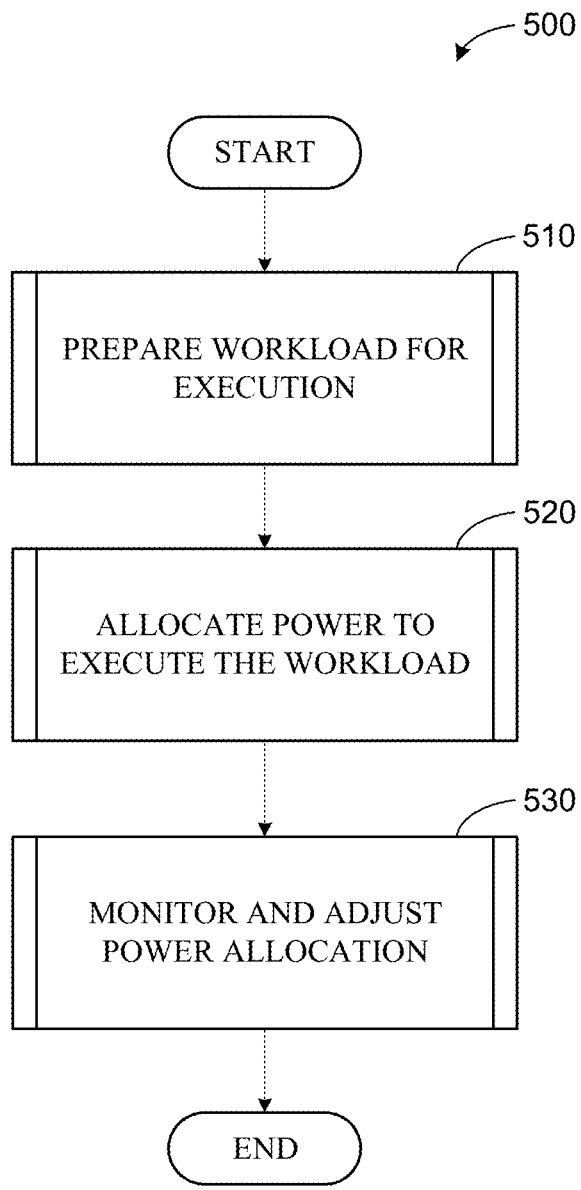
FIGS. 5-8 are flowcharts representative of example machine readable instructions which may be executed to implement the example apparatus of FIG. 1.

A flowchart representative of example hardware logic, machine readable instructions, hardware implemented state machines, and/or any combination thereof for implementing the example apparatus 100 of FIG. 1 is shown in FIG. 5. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5-8, many other methods of implementing the example apparatus 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device, and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 illustrates a process or method 500 implemented by executing program instructions to drive the example apparatus 100 to dynamically configure power allocation for workloads executing on the accelerator apparatus 100. At block 510, the example program 500 includes preparing, by the compiler 130, a workload for execution by the apparatus 100 (e.g., by the processor system 110 and memory 120 of the example apparatus 100). For example, the code generator 215 compiles one or more workloads for execution by the processor system 110 and memory 120 of the apparatus 100. The analyzer 213 analyzes the code for the workload(s) to identify memory accesses, compute instruction executions, etc., to determine a DVFS ratio of compute to memory loads for each workload.

For example, the analyzer 213 analyzes the composition of a workload to determine a transition or improvement (e.g., optimization) point. For each mapping of a workload to execution instructions for the apparatus 100, the analyzer 213 can analyze each layer (e.g., each layer of a deep learning neural network to be implemented by the workload, etc.). For each layer, the analyzer 213 can calculate an execution time per layer. Additionally, the analyzer 213 can determine a desirable (e.g., optimal) accelerator 232-236 frequency for a given memory 120 frequency to be involved in the workload. Execution time can then be updated. The example analyzer 213 can build a DVFS interval to determine a sequence of layers. When a prior execution time minus a new execution time is greater than or equal to a threshold (e.g., old_exec_time-new_exec_time>=threshold), then a DVFS change/transition point has been identified inside the workload. This change point can be noted as an improvement (e.g., optimization) point. Alternatively or in addition, a compute to bandwidth ratio can be computed for each layer, and an absolute ratio can be determined by weighted sum, in which the weights are an approximated time of execution per layer. A DVFS request can be formulated for the power manager 220 based on the transition point. For example, the DFVS request can be formulated as:

```
Dvfs_request
{
    enum IA_level ia_request;
    enum DDR B/W ddr_bw;
    uint32 LLC_ACC_RATIO llc_acc_ratio;
}
```

The output 217 generates workload information 210 including the executable workload and associated meta-data (e.g., ratio, transition/improvement point, other code information, etc.) from the analyzer 213 and the code generator 215, for example. In some examples, a plurality of workload transition points (e.g., a top three, five, etc.) can be output for use by the power manager 220.

At block 520, the example program 500 includes allocating power in the apparatus 100 to execute the workload. For example, the power manager 220 receives the workload executable and associated meta-data from the compiler 130 and determines the power table to store in power table memory 240 using the meta-data associated with the workload for execution.

For example, the power management processor 222 receives a new workload scheduled for execution on the set of accelerators 232-236 as well as associated meta-data such as a list of frequencies and/or a set of one or more optimization points at which the workload should run. For example, an initial portion of the workload may be bandwidth intensive and involve much memory 120 access, while a later portion of the workload, occurring after a DVFS optimization point, may be compute intensive and involve one or more accelerators 232-236 and/or other processor 238 in the processor system 110. The power management processor 222 consolidates power information for one or more running workloads based on the workload information 210 and triggers the power table generator 224 to generate and/or update the power table 240 when workload(s) executing on the SoC 200 change, for example. The power management processor 222 reads a current power level from the power controller 260 and determines new power levels by consolidating workload requests and associated power characteristics.

The example power table generator 224 generates and/or updates the power table in the power table memory 240 based on the compute versus memory power and frequency ratio(s) (also referred to as work ratios) determined by the power management processor 222. The example table generator 224 stores each integrated work ratio to a row or entry of the power table within the example power table memory 240. Each row of the power table corresponds to one work ratio option (e.g., operating frequencies for the processor system 110 versus operating frequencies for memory 120, etc.) for the circuitry of the example processor system 110 and memory 120 to execute at least one workload. The power table memory 240 stores an index 241 which sets a power frequency allocation (and, in some cases, acceptable variation) for each available components, such as the workload management processor allocation 242, cache allocation 243, accelerator allocation 244, memory allocation 245, etc. The table generator 224 triggers the index determiner 226 to update an index into the power table when the power table has been generated and/or updated in power table memory 240.

The example index determiner 226 determines an index corresponding to one row or level of the example power table (e.g., Table 1, etc.) in memory 240. In certain examples, a default index, such as index 0, etc., can be specified for automatic selection by the power controller 260 to configure power allocation/usage of the SoC 200. However, the index determiner 226 can analyze the power table in memory 240 and SoC 200 resource information to determine and recommend another index (e.g., index 2, index N, etc.) rather than a default of index 0 to the power controller 260, for example. For example, based on a current index to the power table, the index determiner 226 can compute an updated index to the power table in power table memory 240 and can transmit the updated index to the power controller 260.

The power controller 260 can operate according to a power configuration specified at a selected index in the power table stored in memory 240. As such, the power controller 260 can configure the SoC 200 with power allocation based on allotted frequencies for the selected index.

At block 530, the example program 500 includes monitoring and adjusting power allocation during execution of the workload by the apparatus 100. For example, resources of the processor system 110 and memory 120 execute the workload according to power frequencies allocated by the selector 266 of the power controller 260 according to the selected index of the power table. In certain examples, the power controller 260 calculates power consumption for the SoC 200 to determine whether the systems of the SoC 200 are within an allocated power budget. The power controller 260 can adjust power consumption by increasing or reducing allocation accordingly by moving up or down among indices in the power table. Thus, when more power is available for allocation, an index in the power table can allocate more power, and, when less power is available for allocation, another index in the power table can allocate less power. Further, when the executing workload(s) call for greater computing resources, an index in the power table can allocate more power to the accelerator(s) 232-236, workload management processor 238, etc., rather than memory 120. However, when the executing workload(s) involve greater need for memory bandwidth, another index in the power table can allocate more power to memory 120, rather than the processor system 110, for example.

For example, the consumption calculator 262 of the power controller 260 determines a current power level for the SoC 200. The comparator 264 compares the current power level to a maximum power level, threshold, limit, etc. When the current power level is less than or greater than the maximum power level, the comparator 264 can trigger a reselection of an index or level in the power table memory 240. The selector 266 selects an index or level in the power table memory 240 for frequency configuration and power allocation in the SoC 200.

Figure 6:
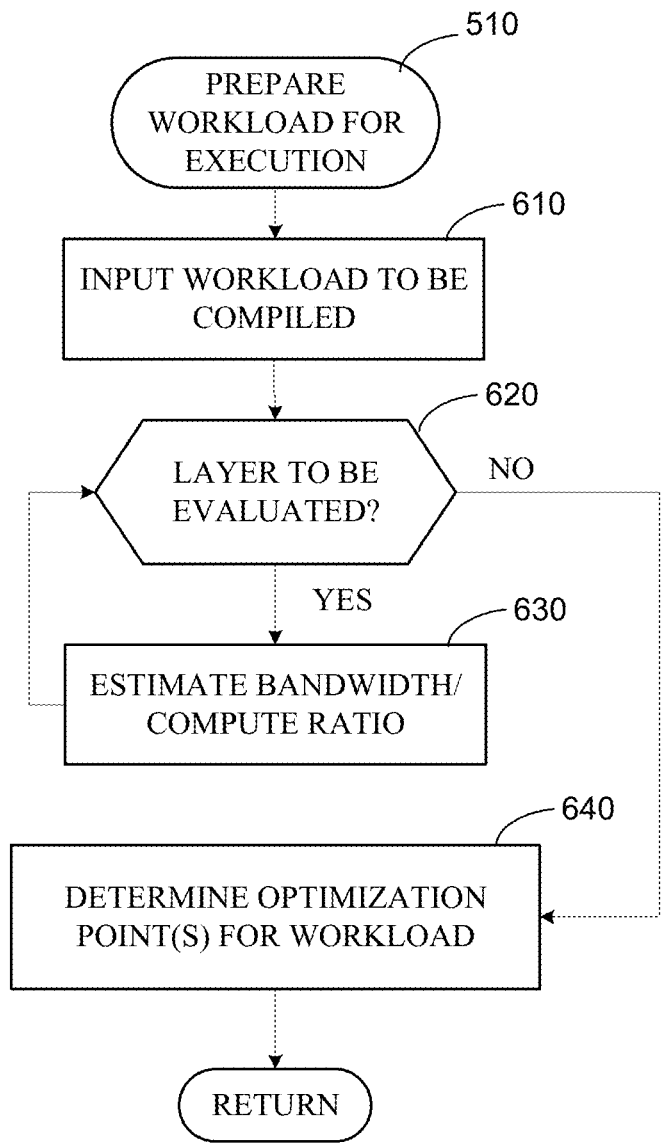

FIG. 6 illustrates an example program 600 to prepare a workload (e.g., an AI workload, etc.) for execution by the apparatus 100 (e.g., an example implementation of block 510 of the example of FIG. 5). At block 610, the workload is input to be compiled by the compiler 130 for execution by the processor system 100 and memory 120. For example, the code generator 215 compiles one or more workloads for execution by the processor system 110 and memory 120 of the apparatus 100.

At block 620, power is evaluated for each layer of the workload. At block 630, a bandwidth/compute ratio is estimated for a given layer of the workload. For example, source code representing instructions involved in the workload to implement a layer of an AI network model (e.g., an inferencing layer of a convolutional neural network, etc.) is analyzed to determine a ratio between compute instructions and memory access instructions in the workload. A transition or improvement (e.g., optimization) point at which execution tasks switch from memory-intensive to compute-intensive can be determined for the layer. For example, the analyzer 213 analyzes the composition of the workload layer to determine a transition point. The analyzer 213 can calculate an execution time for the layer. When a prior execution time minus a new execution time is greater than or equal to a threshold (e.g., old_exec_time-new_exec_time>=threshold), then a DVFS transition/change point has been identified inside the workload layer.

This change point can be noted as an optimization point. Additionally, the analyzer 213 can determine an improved (e.g., optimal or other desirable) accelerator 232-236 frequency for a given memory 120 frequency to be involved in the workload layer.

This process repeats at block 620 for each layer in the workload. At block 640, when all layers have been evaluated, a DVFS request is determined for the workload. For example, execution times, transition points, and other ratio information can be evaluated by the analyzer 213 across the layers of the workload. The example analyzer 213 can build a DVFS interval using individual execution times and associated ratios to determine a sequence of layers, for example. Alternatively or in addition, a compute to bandwidth ratio can be computed for each layer, and an absolute ratio can be determined by weighted sum, in which the weights are an approximated time of execution per layer. Thus, a DVFS request ratio for the workload can be computed and saved as meta-data associated with the executable workload for relay to the power manager 220, for example.

Figure 7:
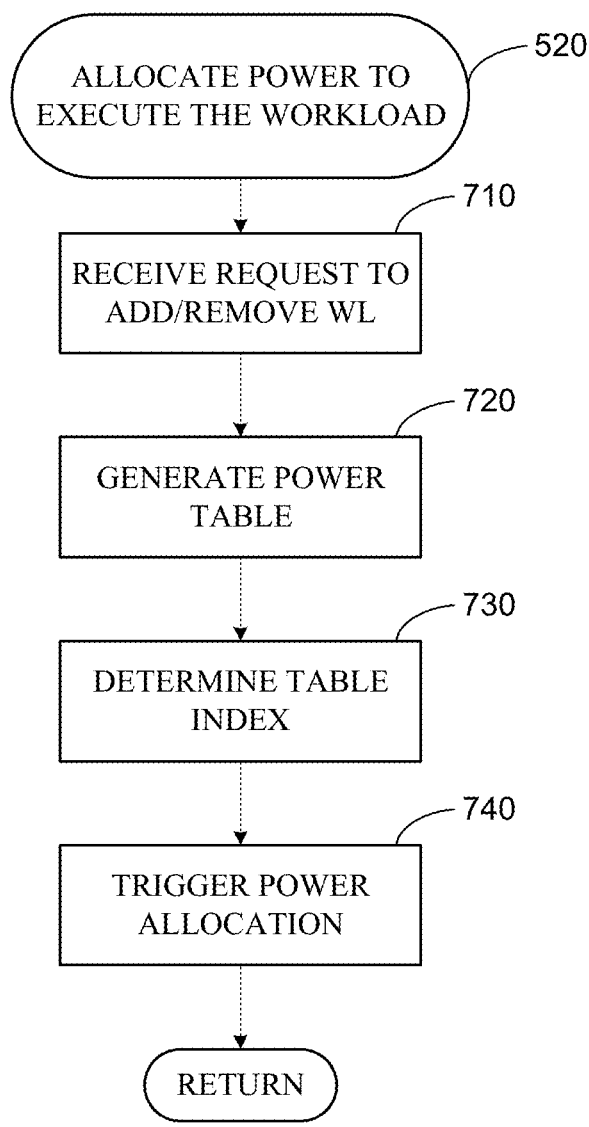

FIG. 7 illustrates an example program 700 to allocate power in the apparatus 100 to execute the workload(s) (e.g., an example implementation of block 520 of the example of FIG. 5). At block 710, a request to add or remove a workload is received. For example, the compiler 130 sends the power manager 220 meta-data regarding the addition or removal of a workload. The power management processor 222 triggers a processing of the meta-data when it is received.

At block 720, a power table is created and/or updated in the power table memory 240. For example, the power management processor 222 receives a new workload scheduled for execution on the set of accelerators 232-236 as well as associated meta-data such as a list of frequencies and/or a set of one or more DVFS transition points at which the workload should run. For example, an initial portion of the workload may be bandwidth intensive and involve much memory 120 access, while a later portion of the workload, occurring after a DVFS transition point, may be compute intensive and involve one or more accelerators 232-236 and/or other processor 238 in the processor system 110. The power management processor 222 consolidates power information for one or more running workloads based on the workload information 210 and triggers the power table generator 224 to generate and/or update the power table 240 when workload(s) executing on the SoC 200 change (e.g., are added, removed, etc.), for example.

The example power table generator 224 generates and/or updates the power table in the power table memory 240 based on the compute versus memory power and frequency ratio(s) (also referred to as work ratios) determined by the power management processor 222. The example table generator 224 stores each integrated work ratio to a row or entry of the power table within the example power table memory 240. Each row of the power table corresponds to one work ratio option (e.g., operating frequencies for the processor system 110 versus operating frequencies for memory 120, etc.) for the circuitry of the example processor system 110 and memory 120 to execute at least one workload. The power table memory 240 stores an index 241 which sets a power frequency allocation (and, in some cases, acceptable variation) for each available components, such as the workload management processor allocation 242, cache allocation 243, accelerator allocation 244, memory allocation 245, etc. The table generator 224 triggers the index determiner 226 to update an index into the power table when the power table has been generated and/or updated in power table memory 240.

At block 730, an index into the power table is determined. For example, the example index determiner 226 determines an index corresponding to one row or level of the example power table (e.g., Table 1, etc.) in memory 240. In certain examples, a default index, such as index 0, etc., can be specified for automatic selection by the power controller 260 to configure power allocation/usage of the SoC 200. However, the index determiner 226 can analyze the power table in memory 240 and SoC 200 resource information to determine and recommend another index (e.g., index 2, index N, etc.) rather than a default of index 0 to the power controller 260, for example. For example, based on a current index to the power table, the index determiner 226 can compute an updated index to the power table in power table memory 240 and can transmit the updated index to the power controller 260.

At block 740, power allocation is triggered. For example, the index determiner 226 communicates an index into the power table to the power controller 260. The power controller 260 can then allocate power to components of the processor system 110 and memory 120 according to a power configuration specified at a selected index in the power table stored in memory 240. As such, the power controller 260 can configure components of the SoC 200 with power allocation based on allotted frequencies for the selected index.

Figure 8:
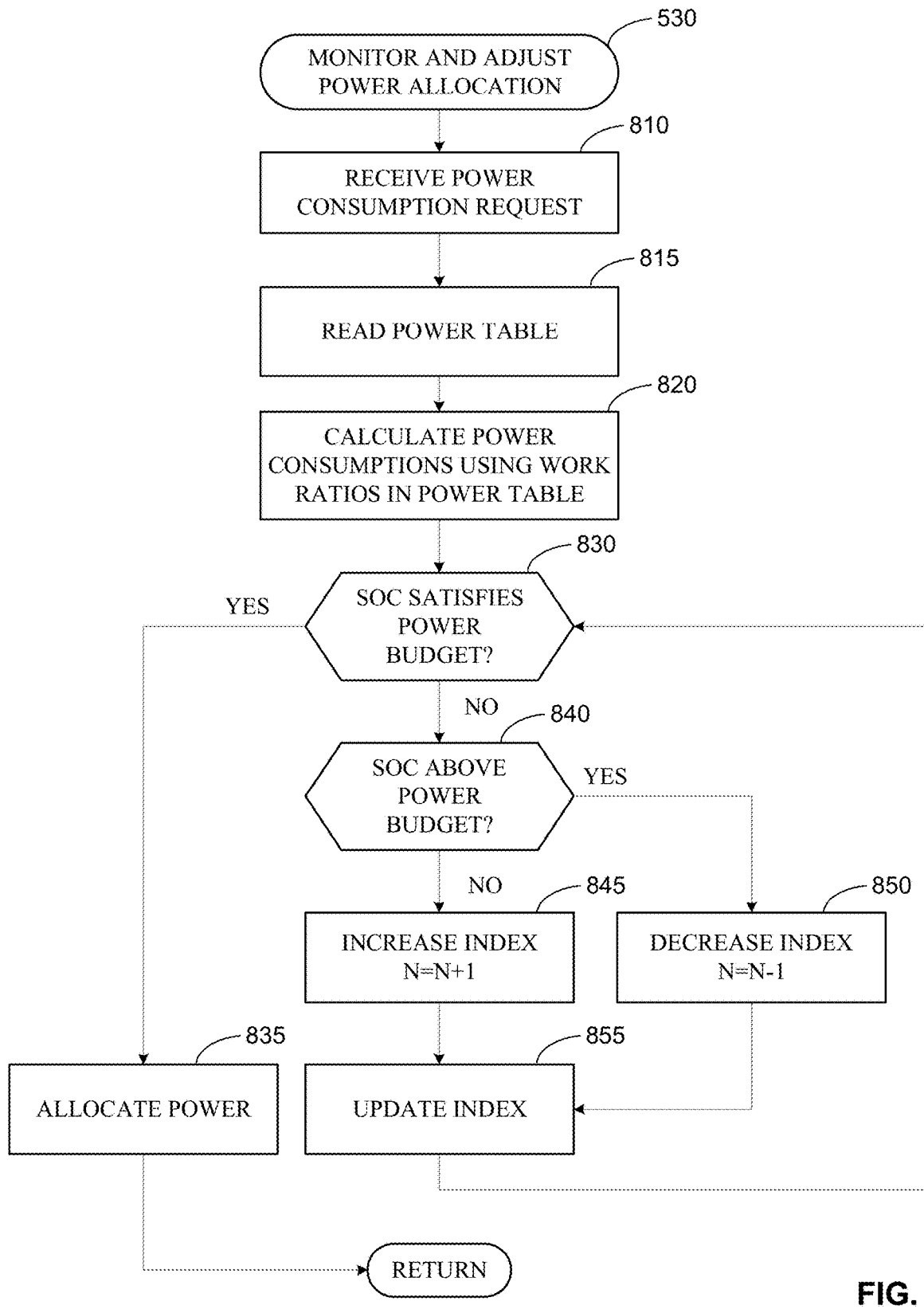

FIG. 8 illustrates an example program 800 to monitor and adjust power allocation in the apparatus 100 during workload execution (e.g., an example implementation of block 530 of the example of FIG. 5). At block 810, the power controller 260 receives a request for power consumption. For example, the power manager 220 and/or the compiler 130 triggers workload execution, which involves power consumption by the apparatus 100. At block 815, the power table is read. For example, the power controller 260 accesses the power table memory 240 to determine power allocation frequencies for the SoC 200 and/or other circuitry of the apparatus 100. The power controller 260 can read and/or otherwise access the power table according to an index provided by the power manager 220, a default index (e.g., 0, 1, etc.), etc. The power controller 260 can then allocate power to components based on configuration information at the index in the power table (e.g., frequency allocation information and/or other limit defined at the index 241 in the power table memory 240, etc.).

At block 820, power consumption is calculated based on work ratio and/or other frequency information in the power table. For example, the consumption calculator 262 of the power controller 260 calculates power consumption for the SoC 200 using actual consumption and/or information at the index 241 to the power table 240 to determine a power level the SoC 200. The power level can be a current power level and/or a projected power level accommodating the new workload, for example. The comparator 264 can compare the power level to a maximum power level, threshold, limit, etc. The power limit/threshold may be set based on physical characteristics of the SoC 200, such as heat tolerance, performance degradation, other material constraint, etc., to avoid damage to the SoC 200 and/or other system impact, for example. The power limit/threshold can include a margin of error or other range in value to provide a buffer or opportunity for error or variance with respect to a true, damaging power limit, for example.

At block 825, based on the comparison, the power controller 260 determines whether the SoC 200 satisfies, meets, or uses its power budget. For example, the allocated power level may be below a power budget limit or threshold; the allocated power level may be at or exceeding the power budget limit or threshold; the allocated power level may be satisfying its power budget at or within a specified range or tolerance below the power budget; etc. For example, addition or subtraction of a workload may bring the power level above or below the power limit/threshold. If the SoC 200 satisfies its power budget, then, at block 835, power is allocated to the SoC 200 and/or other part of the apparatus 100.

However, when the SoC 200 does not satisfy its power budget, the power level of the SoC 200 is further analyzed. For example, at block 840, the comparator 264 of the power controller 260 determines whether the power level of the SoC 200 is above or below its power budget limit/threshold. If the SoC 200 power level is not above its threshold or limit (e.g., is not greater than a specified maximum power level and/or associated range, etc.), then, at block 845, the selector 266 of the power controller 260 can increase to a higher index 241 of the power table. For example, a higher index can correspond to a greater overall power allocation and/or a different distribution of power within the SoC 200, and, when additional power is available to be allocated, the power controller 260 can select a higher index for power allocation from the power table. However, if the SoC 200 exceeds its maximum power allocation, then, at block 850, a lower index 241 is selected from the power table. For example, a lower index 241 corresponding to a lesser and/or different distribution of power can be selected by the selector 266 in the power table memory 240. At block 855, the index 241 is updated to reflect a new power allocation from the power table, and control reverts to block 830 to determine an updated compliance of power allocation with power budget for the SoC 200. When the power budget is satisfied, then, at block 835, power is allocated. As such, the power controller 260 can react to changes in workload to adjust power allocation according to the power table, which can be updated by the power manager 220 as workload(s) are added and/or removed for the SoC 200.

Figure 9:
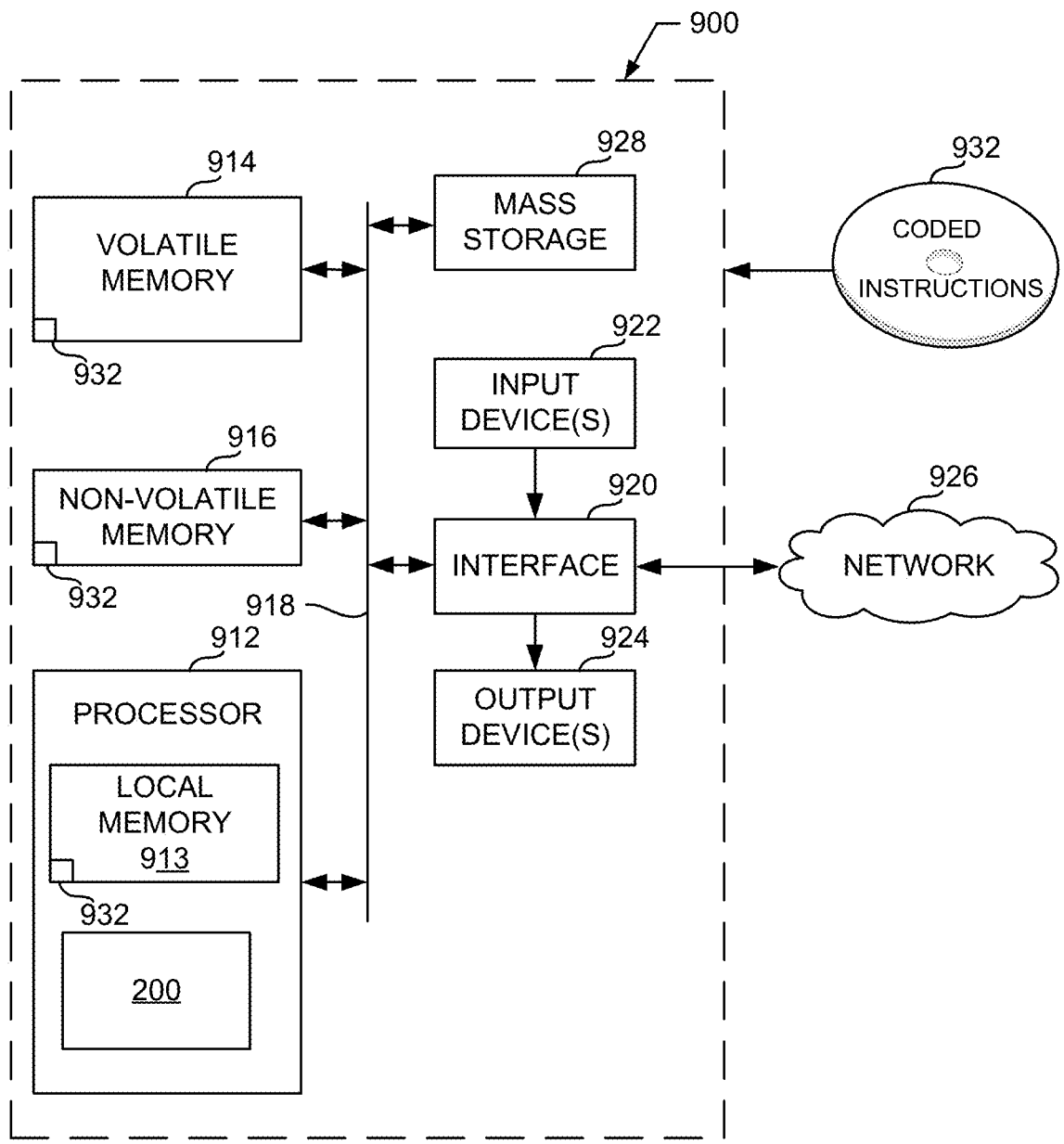
FIG. 9 is a block diagram of an example processing platform structured to execute the instructions of FIGS. 5-8 to implement the example apparatus of FIG. 1.

FIG. 9 is a block diagram of an example processor platform 900 structured to execute the instructions of FIG. 5 to implement the example apparatus 100 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs (including GPU hardware), DSPs, or controllers from any desired family or manufacturer. The hardware processor may be a semiconductor based (e.g., silicon based) device. In this example, the processor 912 implements the example SoC 200 including the example processor system 110, the example memory 120, the example power manager 220, the example power table memory 240, and/or the example power controller 260.

The processor 912 of the illustrated example includes a local memory 913 (e.g., memory 120, etc.). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916, which can also be used to implement memory 120, is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 5-8 may be stored in the mass storage device 928, in the volatile memory 914, in the non-volatile memory 916, and/or on a removable non-transitory computer readable storage medium such as a CD or DVD.

Figure 10:
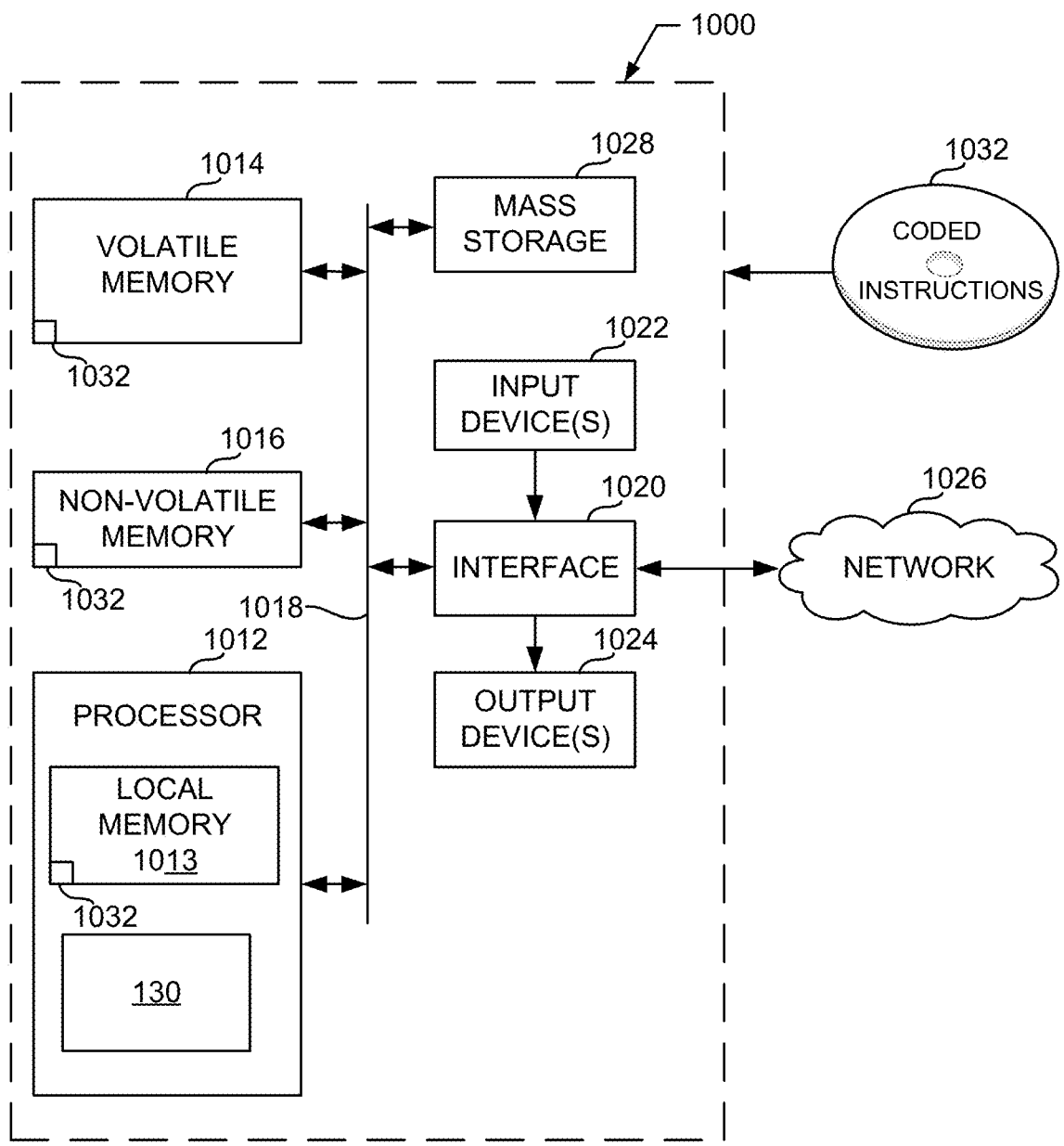
FIG. 10 is a block diagram of an example processing platform structured to execute the instructions of FIGS. 5-8 to implement the example compiler of FIG. 1.

FIG. 10 is a block diagram of an example processor platform 1000 structured to execute the instructions of FIG. 5 to implement the compiler 130 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the compiler 130 including the example receiver 11, the example analyzer 231, the example code generator 215, and the example output 217.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by SDRAM, DRAM, RDRAM®, and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, a Bluetooth® interface, an NFC interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1024 are also connected to the interface circuit 1020 of the illustrated example. The output devices 1024 can be implemented, for example, by display devices (e.g., an LED, an OLED, an LCD, a CRT display, an IPS display, a touchscreen, etc.), a tactile output device, a printer, and/or speaker. The interface circuit 1020 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a DSL connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives.

The machine executable instructions 1032 of FIGS. 5-8 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that improve dynamic power allocation to a processor system and memory. The disclosed apparatus, systems, methods, and articles of manufacture improve the efficiency of the processor system, memory, and other associated circuitry, such as system-on-a-chip circuitry by leveraging compiler meta-data to dynamically extract, update, and tailor power allocation for one or more accelerators, memory, and/or other circuitry for a particular workload or set of workloads to be executed. In certain examples, a deep learning hardware accelerator apparatus is improved through modification of the compiler and addition of a power manager to build and update a power table of frequencies for power allocation to be leveraged by a power controller to dynamically allocate and update allocation of power frequencies to circuitry as workload is added and/or subtracted from the apparatus, as a ratio of compute to memory tasks changes within a given workload, etc. Certain examples improve an accelerator apparatus and its associated compiler by providing an ability to analyze a workload and changes or transitions in work ratio within the workload to allocate power to the workload and change the allocation of power during the workload in a manner previously unavailable. The disclosed methods, apparatus and articles of manufacture are accordingly directed to one or more improvement(s) in the functioning of a computer and/or other processor.

Examples apparatus, systems, methods, and articles of manufacture for managing power of deep learning accelerator systems are disclosed herein. Further examples and combinations thereof include the following.

Example 1 includes an apparatus including a power manager and a power controller. The power manager is to: generate a power table to allocate power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload; update the power table based on a request to at least one of add a second workload or remove the first workload; and determine an index into the power table. The power controller is to: determine a power consumption based on the power table; determine whether to update the index based on a power budget and the power consumption; and allocate power to the accelerator and the memory according to the power frequencies at the index of the power table.

Example 2 includes the apparatus of example 1, further including the memory and the accelerator.

Example 3 includes the apparatus of example 2, wherein the accelerator is one of a plurality of accelerators, the memory and the plurality of accelerators to execute a plurality of workloads.

Example 4 includes the apparatus of example 3, further including a workload management processor.

Example 5 includes the apparatus of example 1, wherein the apparatus is implemented as a system on a chip.

Example 6 includes the apparatus of example 1, further including a compiler.

Example 7 includes the apparatus of example 1, wherein the ratio defines a dynamic voltage and frequency scaling transition point.

Example 8 includes the apparatus of example 1, wherein the workload includes an artificial intelligence workload.

Example 9 includes the apparatus of example 8, wherein the artificial intelligence workload is to implement one or more inference layers of a deep learning neural network.

Example 10 includes the apparatus of example 1, wherein the power controller is to adjust the power allocation to the accelerator in response to a relative frequency change request from the accelerator.

Example 11 includes the apparatus of example 1, wherein the power controller is to: decrement the index when the power consumption is above the power budget and increment the index when the power consumption is below the power budget.

Example 12 includes the apparatus of example 1, further including a power table memory to store the power table.

Example 13 includes the apparatus of example 1, wherein the power manager includes: a power management processor to process the meta-data; a power table generator to at least one of generate or update the power table using the processed meta-data; and an index determiner to determine the index to provide to the power controller.

Example 14 includes the apparatus of example 1, wherein the power controller includes: a consumption calculator to determine a power consumption of the apparatus based on the power table; a comparator to compare the power consumption to a power budget; and a selector to select a level in the power table based on the index and the comparison of the power consumption to the power budget to allocate power to the accelerator and the memory according to the power frequencies at the selected level of the power table.

Example 15 includes at least one non-transitory computer readable storage medium including computer readable instructions that, when executed, cause at least one processor to at least: generate a power table to allocate power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload; update the power table based on a request to at least one of add a second workload or remove the first workload; determine an index into the power table; determine a power consumption based on the power table; determine whether to update the index based on a power budget and the power consumption; and allocate power to the accelerator and the memory according to the power frequencies at the index of the power table.

Example 16 includes the at least one non-transitory computer readable storage medium of example 15, wherein the workload includes an artificial intelligence workload and wherein the instructions, when executed, cause the at least one processor to adjust the power allocation to the accelerator in response to a relative frequency change request from the accelerator.

Example 17 includes the at least one non-transitory computer readable storage medium of example 15, wherein the instructions, when executed, cause the at least one processor to: decrement the index when the power consumption is above the power budget and increment the index when the power consumption is below the power budget.

Example 18 includes a method including: generating, by executing an instruction with at least one processor, a power table allocating power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload; updating, by executing an instruction with the at least one processor, the power table based on a request to at least one of add a second workload or remove the first workload; determining an index into the power table; determining a power consumption based on the power table; determining whether to update the index based on a power budget and the power consumption; and allocating power to the accelerator and the memory according to the power frequencies at the index of the power table.

Example 19 includes the method of example 18, wherein the workload includes an artificial intelligence workload, and further including adjusting the power allocation to the accelerator in response to a relative frequency change request from the accelerator.

Example 20 includes the method of example 18, further including: decrementing the index when the power consumption is above the power budget and incrementing the index when the power consumption is below the power budget.

Example 21 includes an apparatus including: memory including machine reachable instructions; and at least one processor to execute the instructions to: generate a power table to allocate power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload; update the power table based on a request to at least one of add a second workload or remove the first workload; determine an index into the power table; determine a power consumption based on the power table; determine whether to update the index based on a power budget and the power consumption; and allocate power to the accelerator and the memory according to the power frequencies at the index of the power table.

Example 22 includes the apparatus of example 21, wherein the workload includes an artificial intelligence workload and wherein the instructions, when executed, cause the at least one processor to adjust the power allocation to the accelerator in response to a relative frequency change request from the accelerator.

Example 23 includes the apparatus of example 21, wherein the instructions, when executed, cause the at least one processor to: decrement the index when the power consumption is above the power budget and increment the index when the power consumption is below the power budget.

Example 24 includes system-on-a-chip including: a power manager to: generate a power table allocating power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload; update the power table based on a request to at least one of add a second workload or remove the first workload; and determine an index into the power table; and a power controller to: determine a power consumption based on the power table; determine whether to update the index based on a power budget and the power consumption; and allocate power to the accelerator and the memory according to the power frequencies at the index of the power table.

Example 25 includes the system-on-a-chip of example 24, further including the memory and the accelerator.

Example 26 includes an apparatus including: means for generating a power table allocating power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload; means for updating the power table based on a request to at least one of add a second workload or remove the first workload; means for determining an index into the power table; and means for allocating power among the accelerator and memory using the power table to execute the first workload by: determining a power consumption based on the power table; determining whether to update the index based on a power budget and the power consumption; and allocating power to the accelerator and the memory according to the power frequencies at the index of the power table.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An apparatus comprising:
    a power manager to:
        generate a power table to allocate power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload;
        update the power table based on a request to at least one of add a second workload or remove the first workload; and
        determine an index into the power table; and
    a power controller to:
        determine a power consumption based on the power table;
        determine whether to update the index based on a power budget and the power consumption; and
        allocate power to the accelerator and the memory according to the power frequencies at the index of the power table.
2. The apparatus of claim 1, further including the memory and the accelerator.
3. The apparatus of claim 2, wherein the accelerator is one of a plurality of accelerators, the memory and the plurality of accelerators to execute a plurality of workloads.
4. The apparatus of claim 3, further including a workload management processor.
5. The apparatus of claim 1, wherein the apparatus is implemented as a system on a chip.
6. The apparatus of claim 1, further including a compiler.
7. The apparatus of claim 1, wherein the ratio defines a dynamic voltage and frequency scaling transition point.
8. The apparatus of claim 1, wherein the workload includes an artificial intelligence workload.
9. The apparatus of claim 8, wherein the artificial intelligence workload is to implement one or more inference layers of a deep learning neural network.
10. The apparatus of claim 1, wherein the power controller is to adjust the power allocation to the accelerator in response to a relative frequency change request from the accelerator.
11. The apparatus of claim 1, wherein the power controller is to:
    decrement the index when the power consumption is above the power budget and
    increment the index when the power consumption is below the power budget.
12. The apparatus of claim 1, further including a power table memory to store the power table.
13. The apparatus of claim 1, wherein the power manager includes:
    a power management processor to process the meta-data;
    a power table generator to at least one of generate or update the power table using the processed meta-data; and
    an index determiner to determine the index to provide to the power controller.
14. The apparatus of claim 1, wherein the power controller includes:
    a consumption calculator to determine a power consumption of the apparatus based on the power table;
    a comparator to compare the power consumption to a power budget; and
    a selector to select a level in the power table based on the index and the comparison of the power consumption to the power budget to allocate power to the accelerator and the memory according to the power frequencies at the selected level of the power table.
15. At least one non-transitory computer readable storage medium comprising computer readable instructions that, when executed, cause at least one processor to at least:
    generate a power table to allocate power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload;
    update the power table based on a request to at least one of add a second workload or remove the first workload;
    determine an index into the power table;
    determine a power consumption based on the power table;
    determine whether to update the index based on a power budget and the power consumption; and
    allocate power to the accelerator and the memory according to the power frequencies at the index of the power table.
16. The at least one non-transitory computer readable storage medium of claim 15, wherein the workload includes an artificial intelligence workload and wherein the instructions, when executed, cause the at least one processor to adjust the power allocation to the accelerator in response to a relative frequency change request from the accelerator.
17. The at least one non-transitory computer readable storage medium of claim 15, wherein the instructions, when executed, cause the at least one processor to:
    decrement the index when the power consumption is above the power budget and
    increment the index when the power consumption is below the power budget.
18. A method comprising:
    generating, by executing an instruction with at least one processor, a power table allocating power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload;
    updating, by executing an instruction with the at least one processor, the power table based on a request to at least one of add a second workload or remove the first workload;
    determining an index into the power table;
    determining a power consumption based on the power table;
    determining whether to update the index based on a power budget and the power consumption; and allocating power to the accelerator and the memory according to the power frequencies at the index of the power table.

19. The method of claim 18, wherein the workload includes an artificial intelligence workload, and further including adjusting the power allocation to the accelerator in response to a relative frequency change request from the accelerator.

20. The method of claim 18, further including:
decrementing the index when the power consumption is above the power budget and
incrementing the index when the power consumption is below the power budget.

21. An apparatus comprising:
memory including machine reachable instructions; and
at least one processor to execute the instructions to:
generate a power table to allocate power frequencies between an accelerator and memory based on meta-data, the meta-data generated by compiling a first workload to execute on the accelerator and the memory, the meta-data indicating a ratio of compute tasks involving the accelerator and bandwidth tasks involving the memory in the first workload;
update the power table based on a request to at least one of add a second workload or remove the first workload;
determine an index into the power table;
determine a power consumption based on the power table;
determine whether to update the index based on a power budget and the power consumption; and
allocate power to the accelerator and the memory according to the power frequencies at the index of the power table.

22. The apparatus of claim 21, wherein the workload includes an artificial intelligence workload and wherein the instructions, when executed, cause the at least one processor to adjust the power allocation to the accelerator in response to a relative frequency change request from the accelerator.

23. The apparatus of claim 21, wherein the instructions, when executed, cause the at least one processor to:
decrement the index when the power consumption is above the power budget and
increment the index when the power consumption is below the power budget.

* * * * *